United States Patent [19]
van den Berg

[11] 3,979,751
[45] Sept. 7, 1976

[54] TRANSMISSION DEVICE OF A RADIOGRAPHIC NAVIGATION SYSTEM

[75] Inventor: Frederik Louis van den Berg, Hilversum, Netherlands

[73] Assignee: U.S. Philips Corporation, New York, N.Y.

[22] Filed: May 2, 1975

[21] Appl. No.: 574,103

[30] Foreign Application Priority Data
May 7, 1974 Netherlands.................... 7406082

[52] U.S. Cl............................................ 343/106 R
[51] Int. Cl.².......................................... G01S 1/44
[58] Field of Search................ 343/107, 102, 106 R

[56] References Cited
UNITED STATES PATENTS
3,328,798  6/1967  Warfield ........................ 343/106 R
3,534,366  10/1970  Guldenpfennig ................ 343/106 R

*Primary Examiner*—Maynard R. Wilbur
*Assistant Examiner*—T. M. Blum
*Attorney, Agent, or Firm*—Frank R. Trifari; George B. Berka

[57] ABSTRACT

A transmission device of a radiographic navigation system for azimuth determination, in which an electronic rotating directional beam pattern and a static omnidirectional phase reference beam pattern are generated. For obtaining exact phase relationships between the signals required for generating the said beam patterns, phase control loops are included in the signal paths; in these loops the carrier wave frequencies are transposed to a lower frequency and the modulations are removed before phase comparison measurements are performed.

5 Claims, 1 Drawing Figure

U.S. Patent  Sept. 7, 1976  3,979,751
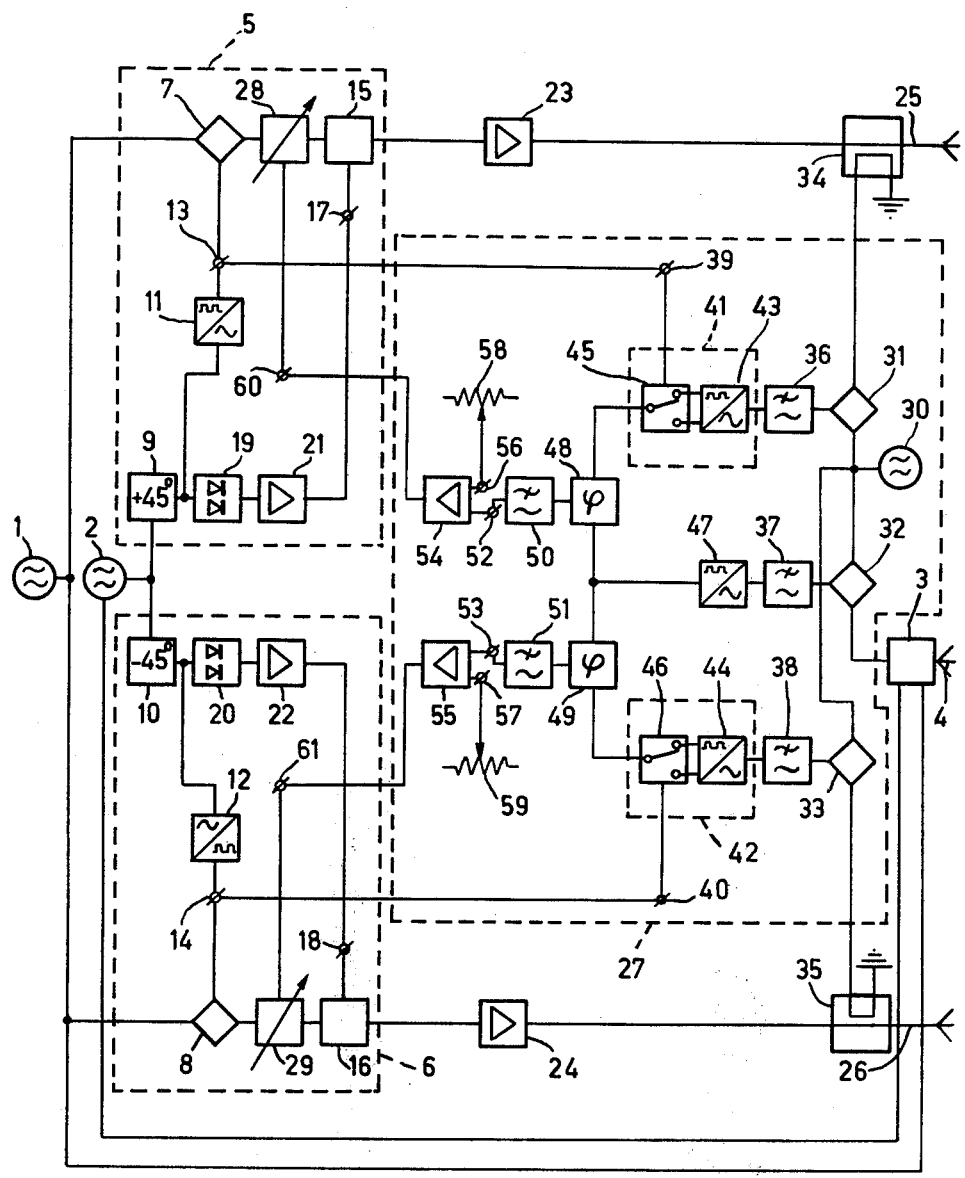

TRANSMISSION DEVICE OF A RADIOGRAPHIC NAVIGATION SYSTEM

The invention relates to a transmission device of a radiographic navigation system for azimuth determination, in which the transmission device generates an electronic, rotating directional beam pattern and a static, omnidirectional phase reference beam pattern, comprising a carrier wave generator and a modulation signal generator, two double sideband modulators which are connected to the two generators and which serve to generate, for the benefit of the rotating directional beam pattern, two double sideband signals having a modulation which is phase-shifted 90° with respect to each other and a suppressed carrier wave, two transistorized powered amplifiers, each of which is coupled to the carrier wave generator and the modulation signal generator for generating a phase reference signal for the benefit of the static beam pattern. A transmission device of this kind is included as a ground beacon in a radiographic navigation system for the determinationn of the azimuth of aeroplanes. More in particular, the azimuth of the aeroplanes with respect to the magnetic north pole is determined on board by means of airborne receives on the basis of the beam patterns transmitted by the ground beacon of such a system.

Radiographic navigation systems of this kind are known as V.O.R. (Very high frequency Omnirange Radio), systems.

For reasons of reliability, the equipment for such systems must be of a completely solid state construction. The major drawback of this requirement is that phase distortion is produced during the amplification of the double sideband signals, generated for the benefit of the rotating directional beam pattern, in the transistorized power amplifiers by the amplitude modulation of these double sideband signals, so that comparatively large errors are made in the determination of the azimuth.

It is known to reduce this phase distortion. Because of the special forms of the signals, many different solutions exist.

It is notably known to eliminate the phase errors produced during power amplification of the saidband signals in the transistorized amplifiers by means of precorrection signals applied to the inputs of the amplifiers. However, such precorrection signals produce an approximate correction of the phase distortion and do not compensate for the phase distortion caused by temperature variations or ageing.

In order to avoid the phase distortion caused by the transistorized power amplifiers, it is furthermore known to combine, by means of a first bridge circuit, the double sideband signals, having a modulation shifted 90° with respect to each other, into one lower single sideband signal and one upper single sideband signal, these single sideband signals being subsequently amplified, and the double sideband signals being recovered by means of a second bridge circuit. In addition to the fact that complex equipment is required for this purpose, this circuit has the drawback that a plurality of phase shifters are required, each of which introduces a phase error, and that phase deviations occur in the double sideband signals with respect to each other because of the mixing stages and particularly because of the non-ideal balancing of the bridge circuits.

It is furthermore known to eliminate phase errors by means of a pulse series which is superimposed on the modulation signal and which has a repetition frequency which amounts to twice the frequency of the modulation signal. However, the phase distortion signals produced by the double sideband signals in the transistorized power amplifiers cannot be eliminated thereby.

The invention has for its object to provide a novel method of eliminating phase errors between each of the double sideband signals and the phase reference signal, in particular the errors which are caused by the said phase distortion, the said method being comparatively simply realizable and offering a surprisingly good phase distortion elimination.

The transmission device according to the invention is characterized in that, in order to obtain exact phase relationships between the phase reference signal and the double sideband signals, a phase comparison device is provided which comprises a mixing signal generator and three mixing devices which are coupled thereto, each mixing device being connected to an output of the power amplifiers and the phase reference signal generator for transposing the carrier wave frequencies of the double sideband signals and the phase reference signal to a lower frequency, and furthermore comprises two modulation eliminators which are provided with control inputs and each of which is coupled to an output of the mixing devices which supply the frequency-transposed double sideband signals, the control inputs being coupled to the modulation signal generator for eliminating the modulation of the frequency-transposed double sideband signals, and furthermore comprises two phase discriminators, each of which is coupled to one of the modulation eliminators, both phase discriminators being coupled, via a modulation eliminator, to the mixing device which supplies the frequency-transposed phase reference signal, there also being provided two phase shifters which have control inputs and which are each included in one of the signal paths of the double sideband signals, the control inputs being coupled to the phase discriminators for controlling the phase of the double sideband signals under the control of control signals supplied by the phase discriminators.

The invention and its advantages will be described in detail hereinafter with reference to one embodiment according to the invention which is shown in the drawing.

The FIGURE shows a section of an embodiment of a transmission device for use in a V.O.R. (Very high frequency Omnirange Radio) system. This system is a radio navigation system for aeroplanes which has been standardized by ICAO (International Civil Aviation Organisation), in which notably the azimuth of the aeroplane with respect to the magnetic north pole can be determined on board aeroplanes on the basis of the beam pattern of the transmission device which is used as a beacon. The beam pattern transmitted by a V.O.R. beacon consists of a rotating beam pattern in the form of an eight and a static, omnidirectional phase reference beam pattern. The rotating beam pattern is electronically realized by transmitting eight-shaped beam patterns in two mutually perpendicular directions, both patterns having a low-frequency modulation with a mutual phase difference of 90°.

In order to generate the aerial signals required for the said beam patterns, the transmission device is provided with a carrier wave generator 1, having a frequency of 108-118 MHz, and a modulation signal generator 2, having a frequency of 30 Hz. Both generators are connected on the one side to a phase reference signal generator 3. A generator of this kind is known, for example, from U.S. Pat. No. 3,328,798, and comprises an auxiliary carrier wave generator which is not separately shown and which supplies an auxiliary carrier wave having a frequency of 9960 Hz. In the phase-reference signal generator 3 the 9960 Hz auxiliary carrier wave signal is frequency modulated, in a known manner which is not shown, by the 30 Hz modulation signal with a frequency sweep of 480 Hz, and the 108–118 MHz carrier wave signal is amplitude modulated by this frequency modulated signal. The signal thus obtained is amplified to obtain the required aerial signal for the phase reference beam pattern. This signal is radiated by the aerial 4 which has an omnidirectional beam pattern.

On the other side, the two generators are connected to double sideband modulators 5 and 6. In these modulators the carrier wave signal is applied to phase reversal modulators 7 and 8. The 30 Hz modulation signal supplied by the modulation signal generator 2 is applied to phase shifters 9 and 10. The phase shifter 9 shown in this embodiment shifts the phase of the modulation signal over 45°, and the phase shifter 10 shifts the phase of the modulation signal over −45°.

The output signals of the phase shifters 9 and 10 are applied to signal zero-crossing detectors 11 and 12, which generate squarewave signals, the edges of which coincide with the zero-crossings of the 30 Hz modulation signals which have been phase shifted 90° with respect to each other. These squarewave signals are applied to control inputs 13, 14 of the phase reversal modulators 7 and 8. When an edge appears in one of the squarewave signals, the modulator which is controlled by this signal reverses the phase of the carrier wave signal applied thereto. The phase-reversed modulated carrier wave signals thus obtained are subsequently applied to amplitude modulators 15 and 16. After full-wave rectification in the full-wave rectifiers 19 and 20 and after having been amplified in the amplifiers 21, 22, the modulation signals which have been phase shifted 90° with respect to each other are applied to control inputs 17 and 18 of these modulators 15 and 16. In these modulators the phase-reversed modulated carrier wave signals are 100% synchronously amplitude modulated by the full-wave rectified modulation signals, synchronous modulation being understood to mean that the instants at which the values of the full-wave rectified modulation signals equal zero coincide with the instants at which the phases of the carrier wave signals are reversed. The signals thus obtained are two double sideband signals with a suppressed carrier wave, the modulations thereof being phase shifted 90° with respect to each other. Even though these signals are suitable for generating a rotating beam pattern as far as their waveform is concerned, they must first be amplified. To this end, these signals are applied to transistorized power amplifiers 23 and 24. The signals thus amplified are applied to the aerials 25 and 26, the beam patterns of which are perpendicular to each other and have the shape of an eight.

Due to the base-collector capacitance of the output transistors in the amplifiers 23 and 24, undesired phase distortion occurs because of the amplitude modulation of the double sideband signals, which causes the azimuths determined in the aeroplane receivers to be inaccurate.

In order to eliminate the phase distortion occurring in the transmission device, notably the phase distortion generated in the transistorized power amplifiers 23 and 24 and possibly the phase distortion generated in the amplitude modulators 15 and 16, according to the invention there are provided a phase comparison device 27 and two phase shifters 28 and 29 which are coupled thereto and which are included in the signal paths of the double sideband signals. The phase comparison device 27 comprises a mixing signal generator 30, for example, a crystal-stabilized generator, and three mixing devices 31, 32 and 33 which are connected thereto. The frequency of the mixing signal produced by the mixing signal generator 30 in this embodiment equals the frequency of the carrier wave signal, increased by 135 KHz. This 135 KHz is inter alia chosen in view of the fact that any undesired mixing signal of the carrier wave with this 135 KHz signal occurring in the output signals of the transmission device causes the least interference, because transmission devices of neighbouring V.O.R. systems have carrier wave frequencies which are shifted in frequency by 50 or 100 KHz.

Using the directional couplings 34 and 35, the mixing devices 31 and 33 are furthermore supplied with signals originating from the power amplifiers 23 and 24, and the mixing device 32 receives a signal which is supplied by the phase reference signal generator 3 and which is identical to the signal applied to the aerial 4 by the phase reference signal generator 3. The mixing devices 31 and 33 supply the double sideband signals, transposed to a carrier wave frequency of 135 KHz, and the mixing device 32 supplies the phase reference signal which has been transposed to 135 KHz. Undesired signals generated by the mixing devices are suppressed by means of the low-pass filters 36, 37 and 38 connected to the mixing devices 31, 32, 33. It is thus achieved that in the phase comparison device 27 phase comparison takes place between signals having a frequency of 135 KHz.

This on the one hand offers the advantage that for the said comparatively low frequency very accurate phase detectors can be made, whilst on the other hand this frequency is still so high that a high phase control speed is realized. The phase errors are substantially eliminated by this optimum.

The phase comparison device furthermore comprises modulation eliminators 41 and 42 which are provided with control inputs 39 and 40 and which are connected to the low-pass filters 36 and 38. These eliminators comprise amplitude eliminators 43 and 44 and phase reversal eliminators 45 and 46 which are connected thereto. The amplitude eliminators 43 and 44, constructed, for example, as clipping circuits, supply rectangular squarewave signals, disregarding very small periods during which the signals disappear and which are situated about the zero-crossings of the 30 Hz envelope signals. These very small periods have a negligible effect only on the phase comparison.

The phase reversal eliminators 45 and 46 are, for example, change-over switches which are realized by means of gate circuits and which are coupled to the control inputs 39 and 40. The squarewave signals generated by the signal zero-crossing detectors 11 and 12 are applied to these control inputs 39 and 40.

Under the control of the edges of these squarewave signals, the change-over switches 45 and 46 are controlled such that the phase reversals occurring in the frequency-transposed sideband signals are eliminated.

Furthermore, the amplitude modulation of the frequency-transposed phase reference signal is eliminated by means of an amplitude eliminator 47 which is constructed as a clipping circuit.

As a result of the described operations, it is achieved that auxiliary signals are generated which contain the phase information can be very accurately recovered. To this end, phase discriminators 48 and 49 are provided, whereto on the one side the signals supplied by the eliminators 41 and 42, being representative of the phase of the double sideband signals are applied, and whereto on the other side the signal supplied by the amplitude eliminator 47, representative of the phase of the phase reference signal, is applied. Using these phase discriminators 48 and 49, differences in the phases of the signal representative of the phase reference signal and each of the signals representative of one of the double sideband signals are determined and applied, in the form of direct voltage signals, to first inputs 52 and 53 of differential amplifiers 54 and 55, via low-pass filters 50 and 51. Potentiometers 58 and 59 apply direct voltage signals to other inputs 56 and 57 of these amplifiers 54 and 55. The differences in the direct voltages on the inputs 52, 56 and 53, 57 of the amplifiers 54 and 55 are applied as control signals to control inputs 60 and 61 of the phase shifters 28 and 29. Under the control of these control signals, the capacitances of the phase shifters 28 and 29, constructed, for example, as varactors, are varied such that the resultant phase variations of the double sideband signals control the control signals to zero.

Using the potentiometers 58 and 59, the phases of the double sideband signals can be separately adjusted to a given fixed value. As a result, corrections can be made for differences in the length of the signal paths of the double sideband signals.

When the steps according to the invention are taken, the phase errors between each of the HF carrier wave signals of the double sideband signals and the phase reference signal is always less than two degrees of the HF carrier wave signal.

What is claimed is:

1. A transmission device of a radiographic navigation system for azimuth determination, in which the transmission device generates a rotating directional beam pattern and a static, omnidirectional phase reference beam pattern, comprising a carrier wave generator and a modulation signal generator, two double sideband modulators which are connected to the two generators and which serve to generate, for the benefit of the rotating directional beam pattern, two double sideband signals having a modulation which is phase-shifted 90° with respect to each other and a suppressed carrier wave, two transistorized power amplifiers, each of which is coupled to one of the modulators, and a phase reference signal generator which is coupled to the carrier wave generator and the modulation signal generator for generating a phase reference signal for the benefit of the static beam pattern, a phase comparison device including a mixing signal generator and three mixing devices which are coupled thereto, each mixing device being coupled to an output of the power amplifiers and the phase reference signal generator for transposing the carrier wave frequencies of the double sideband signals and the phase reference signal to a lower frequency, two modulation eliminators which are provided with control inputs and each of which is coupled to an output of the mixing devices which supply the frequency-transposed double sideband signals, the control inputs being coupled to the modulation signal generator for eliminating the frequency-transposed double sideband signals, and two phase discriminators, each of which is coupled to one of the modulation eliminators, both phase discriminators being coupled, via a modulation eliminator, to the mixing device which supplies the frequency-transposed phase reference signal, and two phase shifters which have control inputs and which are each included in one of the signal paths of the double sideband signals, the control inputs being coupled to the phase discriminators for controlling the phase of the double sideband signals under the control of control signal supplied by the phase discriminators.

2. A transmission device as claimed in claim 1, wherein two differential amplifiers are included, each first input thereof being connected to one of the phase discriminators and each second input thereof being connected to a potentiometer, each of the outputs thereof being connected to a control input of the phase shifters.

3. A transmission device as claimed in claim 1, wherein each modulator comprises the series connection of a phase reversal modulator and an amplitude modulator and in which the phase reversal modulator is connected to the modulation signal generator via a signal zero-crossing detector, the amplitude modulator being connected to the modulation signal generator via a full-wave rectifier, and each modulation eliminator comprises the series connection of an amplitude eliminator and a phase reversal eliminator, the phase reversal eliminator being provided with control inputs which are connected to the zero-crossing detectors.

4. A transmission device as claimed in claim 3, wherein the amplitude eliminator is a change-over switch.

5. A transmission device as claimed in claim 1, wherein the frequency of the mixing signal generator is 135 KHz.

* * * * *